United States Patent [19]

Andel et al.

[11] Patent Number: 5,715,864
[45] Date of Patent: Feb. 10, 1998

[54] SAFE-FAILING HYDRAULIC PRESSURE RELIEVING/DUMPING VALVE

[75] Inventors: David F. Andel, Lawrenceville; David R. Jeter, Woodstock, both of Ga.

[73] Assignee: Nordson Corporation, Westlake, Ohio

[21] Appl. No.: 527,476

[22] Filed: Sep. 13, 1995

[51] Int. Cl.[6] .................................................. E03B 7/07
[52] U.S. Cl. .......................... 137/563; 137/576; 251/63.6
[58] Field of Search ..................................... 137/563, 571, 137/576; 251/63.6; 141/348, 364

[56] References Cited

U.S. PATENT DOCUMENTS

| | | | |
|---|---|---|---|
| 3,115,894 | 12/1963 | Marx | 137/576 |
| 4,360,132 | 11/1982 | Vilagi et al. | 222/504 |
| 4,565,217 | 1/1986 | McIntyre | 137/563 |
| 4,657,047 | 4/1987 | Kolibas | 137/563 |
| 5,289,810 | 3/1994 | Bauer et al. | 137/563 |

Primary Examiner—A. Michael Chambers
Attorney, Agent, or Firm—Roger D. Emerson, Esq.

[57] ABSTRACT

A device for relieving the pressure of pressurized materials, such as sprayable hot melt adhesives includes a storage tank (40), a manifold (44), a source of pressure for pressurizing the pressurized materials, and a dump valve (10) for relieving the pressure of the pressurized materials when the device is deactivated or turned off. The dump valve (10) includes a relief port (22) and a spring and compressed air arrangement for opening and closing the relief port (22). The dump valve (10) can be combined with a pressure relief valve and can be retrofitted to existing manifolds (44). A method of depressurizing a pressurized device for spraying pressurized material is also disclosed and includes the steps of activating a pressure means for pressurizing materials within a manifold, pressurizing the materials via the pressure means, deactivating the pressure means, and relieving the pressure of the materials when the pressurizing means is deactivated.

16 Claims, 3 Drawing Sheets

SAFE-FAILING HYDRAULIC PRESSURE RELIEVING/DUMPING VALVE

DESCRIPTION OF THE INVENTION

This invention pertains generally to the art of pressurized devices and for methods of relieving pressure when the devices are turned off, and more specifically to pressurized devices used for spraying hot liquid adhesives.

In the past, pressurized devices have been used for spraying pressurized materials such as hot melt adhesives. Portions of these devices have remained pressurized after the device was turned off or deactivated. Any pressure relief had to be accomplished manually by opening the system, or through pressure relief valves that worked only when the pressure within the device reached critically high levels.

The retention of such pressurized areas presented a threat of personal injury or property damage. In addition, some jurisdictions require conformance to safety requirements that require pressure to be relieved when the devices were turned off.

The present invention contemplates a new and improved pressure relief dump valve for those situations when the device is deactivated. The invention is simple in design, effective in use, and overcomes the foregoing difficulties and others while providing better and more advantageous overall results.

SUMMARY OF THE INVENTION

In accordance with the present invention, a new and improved pressure relief dump valve is provided which can be attached to existing pressurized devices to relieve pressure in the devices when the devices are turned off.

More particularly, in accordance with the invention, the pressure relief dump valve is a portion of a pressurized device that comprises a storage tank; a manifold adjacent to the storage tank; spraying means for spraying hot liquid adhesive attached to the manifold; the dump valve for relieving pressure when the device is turned off, the dump valve comprising a relief port and closing means for opening and closing the relief port; and the relief port allowing the hot liquid adhesive to return to the storage tank.

According to another aspect of the invention, the dump valve comprises a first cylinder; a piston, the piston being disposed within the first cylinder; a first spring, the first spring being attached to the piston; venting means, the venting means being disposed to allow the venting of air around the first spring; air means for supplying compressed air to the piston; the piston forces the closing means to close when compressed air is applied to the piston by the air means; and the first spring acts on the piston to open the closing means when supply of compressed air is removed.

One advantage of the present invention is its capability to relieve pressure from the device mechanically when the device is turned off.

Another advantage of the present invention is the capability of the invention to be fitted onto or screwed into existing relief ports of pressurized devices.

Still another advantage of the present invention is the capability of the invention to fail in a safe position by releasing pressure in case of failure.

Yet another advantage of the present invention is the capability of the invention to make pressurized systems safer.

Still yet another advantage of the present invention is the capability of the invention to simplify current methods of relieving pressure from the pressurized devices when the devices are turned off.

Still other benefits and advantages of the invention will become apparent to those skilled in the art upon a reading and understanding of the following detailed specification.

DESCRIPTION OF THE DRAWINGS

The following is a brief description of the drawings in which like parts may bear like reference numerals and in which.

DETAILED DESCRIPTION OF THE INVENTION

Figure 1:
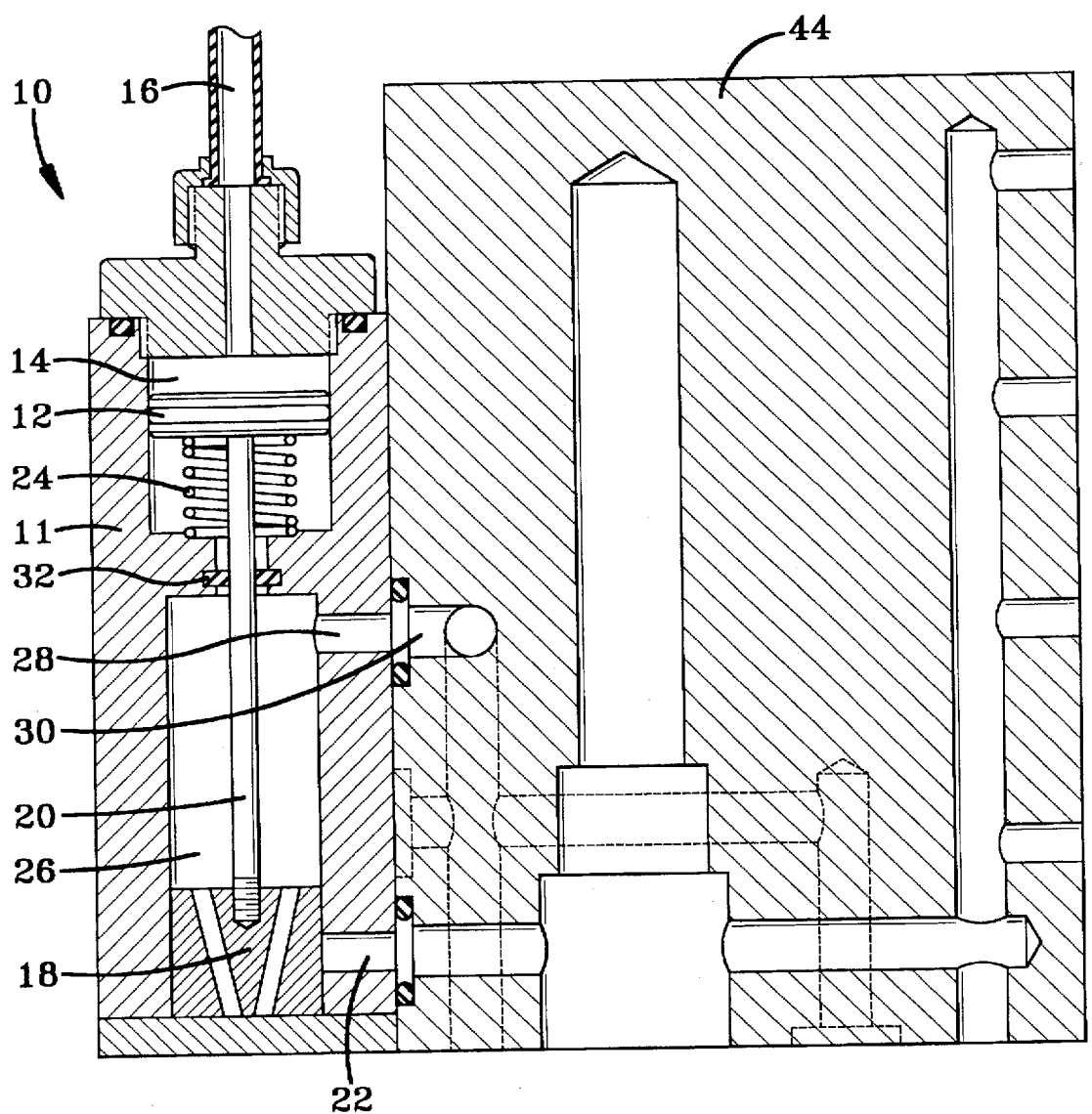
FIG. 1 is a cross-sectional view of a dump valve and a pressurized device body.

Referring now to the drawings wherein the showings are for purposes of illustrating a preferred embodiment of the invention only and not for purposes of limiting same, FIG. 1 shows a manifold 44, part of a device for dispensing pressurized fluids, such as hot melt adhesives. A dump valve 10 is attached to the manifold 44 according to the present invention. The dump valve 10 comprises a housing 11 within which a piston 12 is located. The piston 12 moves from a first position to a second position within a piston cylinder 14, which is forced in one direction by pressurized air supplied by a pressurizing means (not shown) via an air tube 16 attached to the piston cylinder 14. In the preferred embodiment the pressurizing means is a main unit solenoid (not illustrated). The piston 12 forces a plunger 18, connected to the piston 12 by a connecting rod 20, to close the pressure relief port 22 of the manifold A.

When the device is not in use or is deactivated or turned off, the supply of pressurized air is removed. A spring 24, located in the piston cylinder 14 and attached to the piston 12, pushes upwardly (as viewed in FIG. 1), thereby forcing the piston 12 to pull the plunger 18 out of the pressure relief port 22, allowing the pressurized adhesive to exit the relief cylinder 26 via an exit port 28 and, in the preferred embodiment, to return to a storage tank (not illustrated) via a tank tube 30. The relief cylinder 26 and the piston cylinder 14 are separated by a seal 32.

Figure 2:
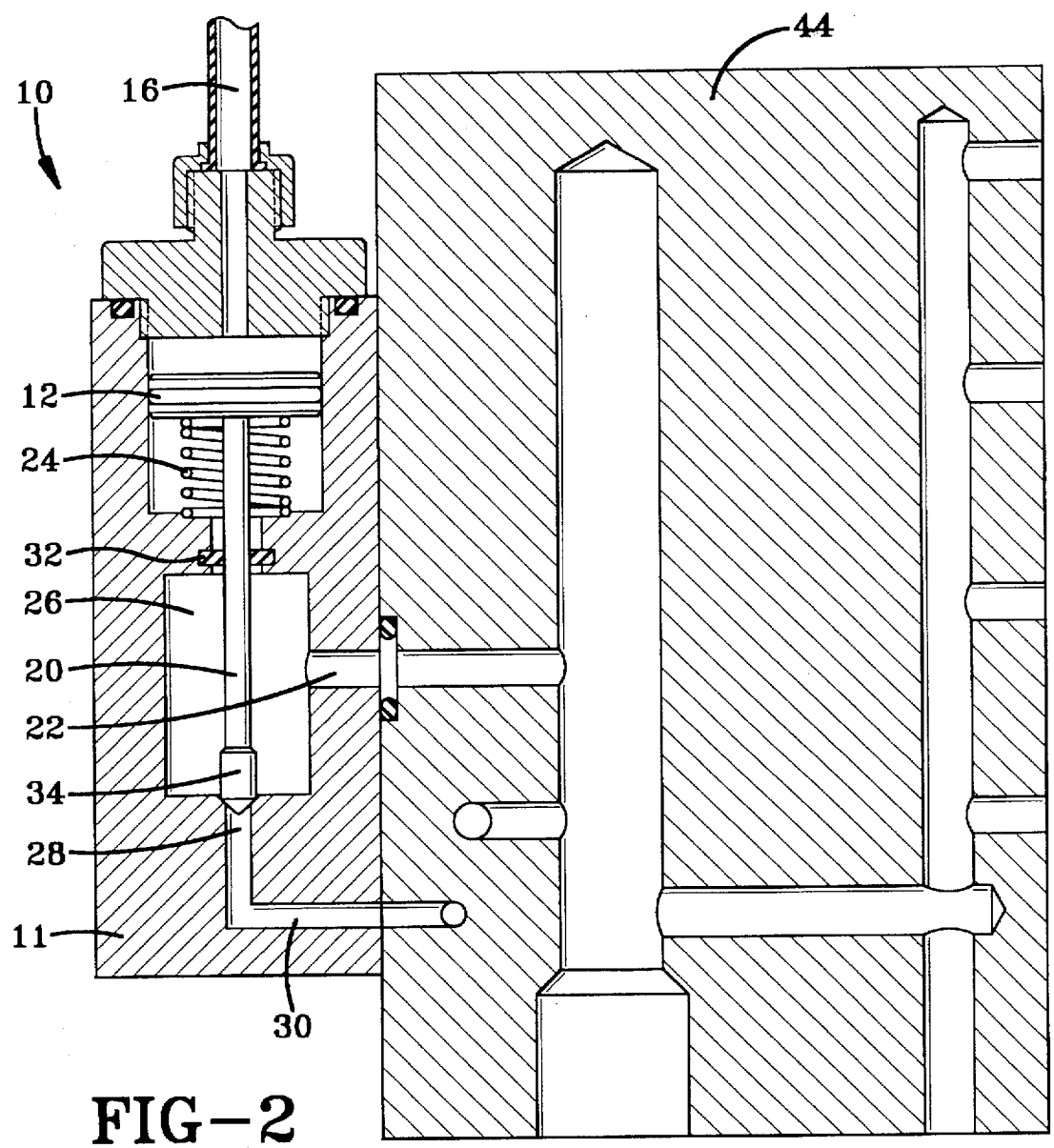
FIG. 2 is another embodiment of a dump valve.

With reference to FIG. 2, another embodiment of the present invention is shown. The connecting rod 20 is connected to a needle valve 34. In the embodiment shown, the needle valve 34 closes the exit port 28 when the device is operational. The pressure relief port 22 is always open, allowing the pressurized materials into the relief cylinder 26 during operation of the device. When the device is turned off and the supply of compressed air to the piston 12 is removed, the spring 24 forces the piston 12 to open the needle valve 34, allowing pressurized material to flow through the exit port 28 to the storage tank (not illustrated) via the tank tube 30.

Figure 3:
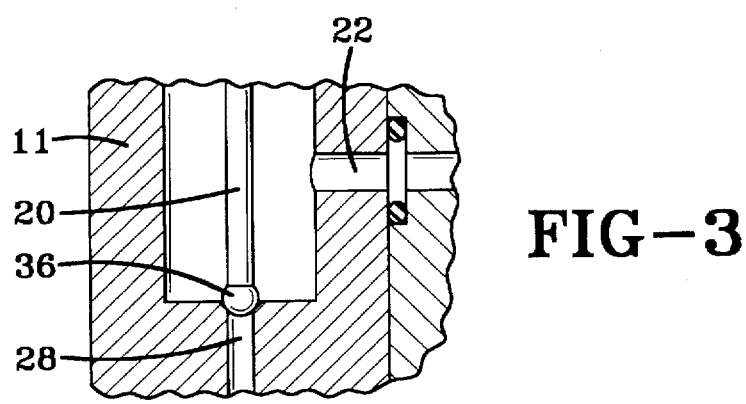
FIG. 3 is a close up of another embodiment of a valve.

With reference to FIG. 3, another embodiment of the invention illustrated in FIG. 2 is shown. The connecting rod 20 is connected to a ball valve 36, which closes the exit port 28 when the device is operational.

Figure 4:
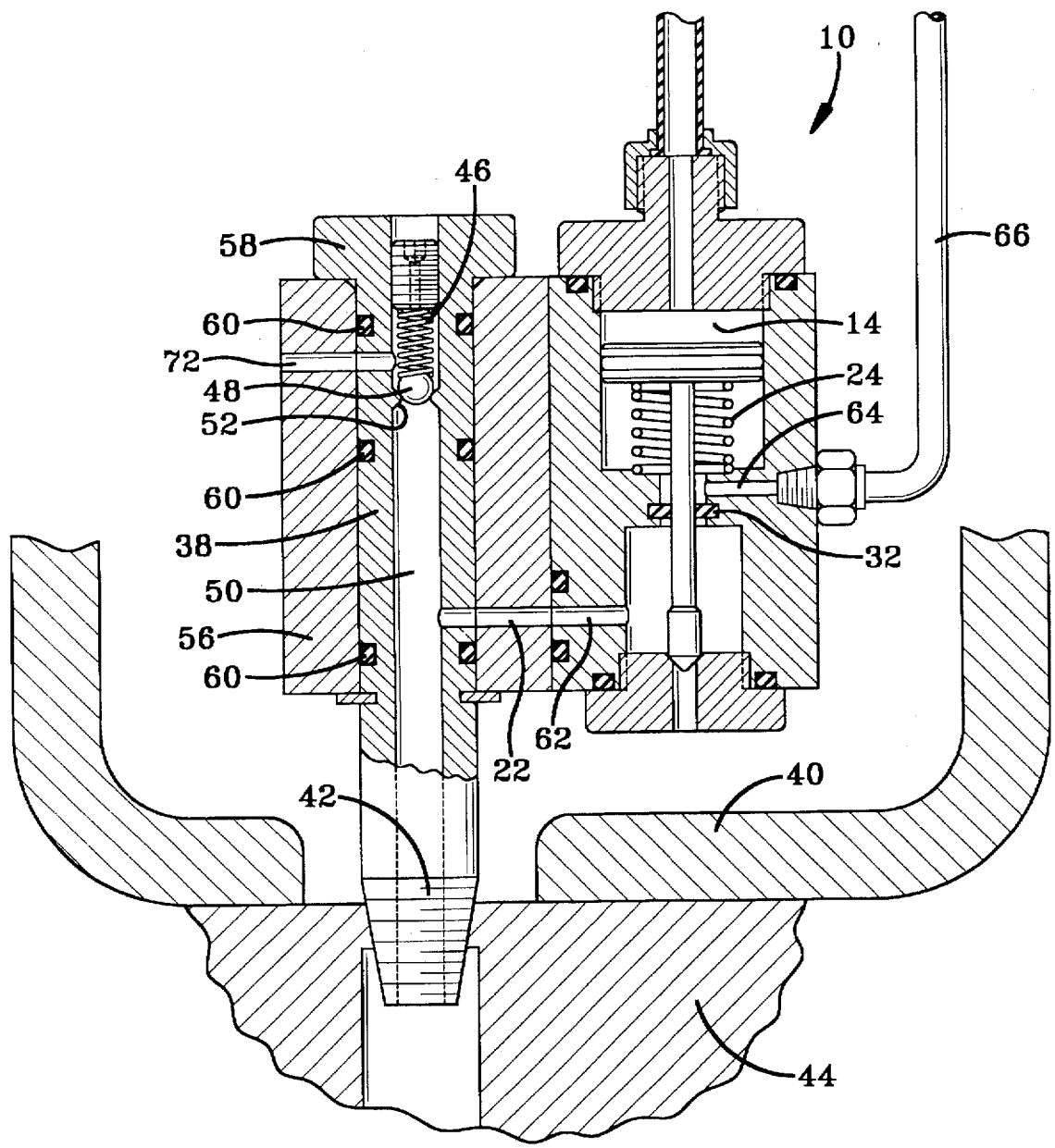
FIG. 4 is a cross-sectional view of a dump valve and a pressure relief valve attached to a pressurized device.

With reference to FIG. 4, another and preferred embodiment of the present invention is shown. The dump valve 10 is attached to a pressure relief valve 38, which relieves critically high pressure through conduit 72 during operation of the device. The dump valve 10 and pressure relief valve 38 sit inside a storage tank 40 for the hot liquid adhesive. The pressure relief valve 38 has an attaching means, in the preferred embodiment threads 42, to enable it to be screwed into the manifold 44 of the device.

With continuing reference to FIG. 4, the pressure relief valve 38 comprises a spring 46 adjacent to a ball valve 48. The pressure relief valve 38 further comprises a cylinder 50 with a narrow portion 52. In normal operation, the ball valve 48 seals the narrow portion 52. When the pressure of the pressurized material in the cylinder 50 and manifold 44 exceeds a critical level related to the spring constant of the spring 46, the pressure forces open the ball valve 48, allowing pressurized hot adhesive to pass through the narrow portion 52 and to leave the system through a relief port 72 and enter the storage tank 40. When the pressure drops below the critical level, the spring 46 closes the ball valve 48, thus sealing off the narrow portion 52 and relief port 72.

The pressure relief valve 38 is located within a stationary housing 56 and further comprises a fastening means, in this preferred embodiment a hexagonal bolt portion 58 located on the opposite end of the threads 42. The pressure relief valve 38, the hexagonal bolt portion 58, and the threads 42 are rotatable within the stationary housing 56. In other words, the pressure relief valve 38 and the hexagonal bolt portion 58 rotate while the stationary housing 56 doesn't, thereby enabling the pressure relief valve 38 to be screwed into the manifold 44. O-ring seals 60 are provided to prevent the leakage of pressurized material between the pressure relief valve 38 and the housing 56.

The pressure relief port 22 and the cylinder 50 of the pressure relief valve 38 are connected by a tube 62 that runs through the stationary housing 56. A vent 64 is provided to ventilate the area of the piston cylinder 14 around the spring 24. In the preferred embodiment, a snorkel 66 is provided to provide the air for the ventilation.

While certain representative embodiments and details have been shown for the purpose of illustrating the invention, it will be apparent to those skilled in the art that various changes and modifications can be made therein without departing from the scope of the invention.

It is claimed:

1. A device for relieving the pressure of pressurized materials, said device comprising:
   a storage tank;
   a manifold, said manifold being operatively associated with said storage tank;
   a pressurizing means for pressurizing said pressurized materials; and,
   a dump valve for relieving the pressure of said pressurized materials when said pressurizing means is turned off, said dump valve comprising a relief port and closing means for opening and closing said relief port, said relief port allowing the pressurized materials to depressurize, said dump valve further comprising:
   a first cylinder;
   a piston, said piston being disposed within said first cylinder and moveable between a first position and a second position;
   air means for supplying compressed air to said piston and moving said piston between said first and second position;
   venting means, said venting means being disposed to allow the venting of the compressed air around said first spring; and,
   a first spring, said first spring being attached to said piston, said piston moving to said first position and closing said closing means when compressed air is applied to said piston by said air means, said first spring moving said piston to said second position and opening said closing means when said supply of compressed air is removed.

2. The device as described in claim 1 including a pressure relief valve, said pressure relief valve being attached to said dump valve and comprising:
   a second cylinder having first, second and third portions, said second portion being more narrow than said first portion;
   a second spring being disposed in said first portion;
   a ball valve, said ball valve being attached to said second spring and having a sufficient diameter to seal said second portion; and,
   a pressure relief port, said pressure relief port being disposed in said first portion;
   said second spring holding said ball valve closed against pressure of the pressurized material in said second portion and said third portion below a specified level of pressure related to the spring constant of said second spring, said second spring ball valve capable of opening when said pressurized materials reach a preset pressure, said opening of said second spring ball valve releasing pressurized material through said pressure relief port.

3. The device as described in claim 2 further comprising a screw means to attach said pressure relief valve and said dump valve to said manifold, said screw means comprising:
   a housing, said second cylinder being selectively receivable within a bore in said housing, said second cylinder being rotatable with respect to said housing, said second cylinder comprising screw threads at one end of said third portion and a fastening means at one end of said first portion, said pressure relief valve being located within said second cylinder, said dump valve being located within said housing; and,
   an o-ring seal, said o-ring seal being located between said second cylinder and said housing.

4. The device as described in claim 3 wherein said closing means comprises a needle valve, said needle valve being attached to said piston and closing and sealing said relief port when said air means is activated.

5. The device as described in claim 3 wherein said closing means comprises a ball valve, said ball valve being attached to said piston and closing and sealing said relief port when said air means is activated.

6. The device as described in claim 3 wherein said closing means comprises a plunger, said plunger being attached to said piston and closing and sealing said relief port when said air means is activated.

7. The device of claim 1 wherein said pressurized materials are depressurized by being vented into said storage tank.

8. The device of claim 1 wherein the pressurized material is hot melt adhesives.

9. A dump valve for retrofitting to an existing device for dispensing pressurized materials, said device comprising a storage tank, a manifold, and a pressurizing means for pressurizing said pressurized materials, said dump valve capable of relieving the pressure of said pressurized materials when said pressurizing means is turned off, said dump valve comprising:
   a housing, said housing being retrofittedly attachable to said manifold;

a relief port in said housing, said relief port being connected to and communicating with said storage tank;

closing means for opening and closing said relief port, said closing means being within said housing, said relief port allowing the pressurized materials to return depressurized to said storage tank;

a first cylinder;

a piston, said piston being disposed within said first cylinder and moveable between a first position and a second position;

air means for supplying compressed air said piston and moving said piston between said first and second position;

venting means, said venting means being disposed to allow the venting of the compressed air around said first spring; and, a first spring, said first spring being attached to said piston, said piston moving to said first position and closing said closing means when compressed air is applied to said piston by said air means, said first spring moving said piston to said second position and opening said closing means once the supply of compressed air is removed.

10. The device as described in claim 9 including a pressure relief valve, said pressure relief valve being attached to said dump valve and comprising:

a second cylinder having first, second and third portions, said second portion being more narrow than said first portion;

a second spring being disposed in said first portion;

a ball valve, said ball valve being attached to said second spring and having a sufficient diameter to seal said second portion; and, a pressure relief port, said pressure relief port being disposed in said first portion;

said second spring holding said ball valve closed against pressure of the pressurized material in said second portion and said third portion below a specified level of pressure related to the spring constant of said second spring, said second spring ball valve capable of opening when said pressurized materials reach a preset pressure, said opening of said second spring ball valve releasing pressurized material through said pressure relief port.

11. The device as described in claim 9 further comprising a screw means to attach said pressure relief valve and said dump valve to said manifold, said screw means comprising:

a housing, said second cylinder being located within a bore in said housing, said second cylinder being rotatable with respect to said housing, said second cylinder comprising screw threads at one end of said third portion and a bolt at one end of said first portion, said pressure relief valve being located within said second cylinder, said dump valve being located within said housing; and, an o-ring seal, said o-ring seal being located between said second cylinder and said housing.

12. The device as described in claim 11 wherein said closing means comprises a needle valve, said needle valve being attached to said piston and closing and sealing said relief port when said air means is activated.

13. The device as described in claim 11 wherein said closing means comprises a ball valve, said ball valve being attached to said piston and closing and sealing said relief port when said air means is activated.

14. The device as described in claim 11 wherein said closing means comprises a plunger, said plunger being attached to said piston and closing and sealing said relief port when said air means is activated.

15. The device of claim 9 wherein said pressurized materials are depressurized by being vented into said storage tank.

16. The device of claim 9 wherein the pressurized material is hot melt adhesives.

* * * * *